(12) United States Patent
Aiki

(10) Patent No.: US 6,980,503 B2
(45) Date of Patent: Dec. 27, 2005

(54) OPTICAL PICKUP AND DISK DRIVE UNIT

(75) Inventor: Kazuma Aiki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/498,493

(22) PCT Filed: Oct. 7, 2003

(86) PCT No.: PCT/JP03/12823

§ 371 (c)(1),
(2), (4) Date: Jan. 24, 2005

(87) PCT Pub. No.: WO2004/036566

PCT Pub. Date: Apr. 29, 2004

(65) Prior Publication Data

US 2005/0122881 A1 Jun. 9, 2005

(30) Foreign Application Priority Data

Oct. 21, 2002 (JP) .............................. 2002-305843

(51) Int. Cl.[7] .............................................. G11B 7/00
(52) U.S. Cl. .............................................. 369/112.01
(58) Field of Search ........................ 369/112.01, 121, 369/120, 122, 44.37, 112.05, 112.22

(56) References Cited

U.S. PATENT DOCUMENTS 6,671,247 B1 * 12/2003 Arai et al. ............. 369/112.01

FOREIGN PATENT DOCUMENTS

JP 11-149657 6/1999

* cited by examiner

*Primary Examiner*—Nabil Hindi
(74) *Attorney, Agent, or Firm*—Oblon, Spivak, McClelland, Maier & Neustadt, P.C.

(57) ABSTRACT

An optical pickup and disk drive apparatus has a light-emitting device (14) having a first light emitter (14a) and a second light emitter (14b) for emitting a first laser beam and a second laser beam, respectively, a light splitter (18), a collimator lens (19) for converting the first laser beam and the second laser beam into a parallel beam, and a light-detecting device (29). The first laser beam has an optical axis aligned with the optical axis of an objective lens (13), and the second laser beam has an optical axis displaced off the optical axis of the objective lens. The second light emitter is placed in a position where the angle α of incidence of the second laser beam on the light splitter is greater than the angle θ of incidence of the first laser beam on the light splitter, for thereby reducing the amount of generated aberrations for increased performance.

2 Claims, 6 Drawing Sheets

OPTICAL PICKUP AND DISK DRIVE UNIT

TECHNICAL FIELD

The present invention relates to a technical field of optical pickup and disk drive apparatus. More specifically, the present invention relates to a technical field for reducing an amount of generated aberrations for increased performance in an optical pickup for recording and/or reproducing information signals on and/or from two different types of disk-shaped recording media and disk drives which have such an optical pickup.

BACKGROUND ART

There are disk drive apparatus for recording information signals on and reproducing information signals from disk-shaped recording media. Such a disk drive apparatus has an optical pickup movable radially across a disk-shaped recording medium mounted on a disk table for applying a laser beam through an objective lens to the disk-shaped recording medium.

Some disk drive apparatus are capable of recording information signals on and reproducing information signals from disk-shaped recording media of different types, e.g., CD (compact disks) and DVD (digital versatile disks).

Such disk drive apparatus are required to emit two laser beams having different wavelength ranges from a light-emitting device because of different recording densities on CD and DVD. For the purpose of reducing the size of the optical pickup, a disk drive apparatus has an objective lens shared by two types of disk-shaped recording media and a light-emitting device comprising two light emitters disposed in one package for emitting respective two laser beams having different wavelength ranges. In such a disk drive apparatus, for example, the first light emitter emits a first laser beam having a wavelength of 650 nm to a DVD, and the second light emitter emits a second laser beam having a wavelength of 780 nm to a CD.

However, since the objective lens of the above disk drive apparatus is shared, the first light emitter and the second light emitter are disposed parallel to each other in a direction perpendicular to the optical axis of the objective lens. Therefore, though the optical axis of the laser beam emitted from one of the light emitters can be aligned with the optical axis of the objective lens, the optical axis of the laser beam emitted from the other light emitter has to be off the optical axis of the objective lens.

Since the optical axis of the laser beam emitted from either one of the light emitters needs to be off the optical axis of the objective lens, when the laser beam is emitted from the light emitter whose optical axis is off the optical axis of the objective lens, an amount of aberrations that are generated tends to be large, resulting in a reduction in the performance of the optical pickup thereby to cause a recording error and a reproduction error due to a signal level reduction or the like.

An optical pickup and a disk drive apparatus according to the present invention are aimed at overcoming the above problems and reducing an amount of aberrations generated for increased performance.

DISCLOSURE OF INVENTION

To solve the above problems, an optical pickup and disk drive apparatus according to the present invention has a light-emitting device having a first light emitter and a second light emitter for emitting, to two different types of disk-shaped recording media, respectively, a first laser beam and a second laser beam, respectively, having a first wavelength and a second wavelength, respectively, which correspond to the respective disk-shaped recording media, a light splitter for passing the first laser beam and the second laser beam which are emitted from the light-emitting device toward the disk-shaped recording media, and reflecting the first laser beam and the second laser beam which are reflected respectively by the disk-shaped recording media, a collimator lens disposed between the light splitter and the objective lens, for converting the first laser beam and the second laser beam which are emitted from the light-emitting device into a parallel beam, and a light-detecting device for being irradiated with the first laser beam and the second laser beam which are reflected by the light splitter, the first laser beam having an optical axis aligned with the optical axis of the objective lens, the second laser beam having an optical axis displaced off the optical axis of the objective lens, wherein the second light emitter is placed at a position where the angle of incidence on the light splitter of the second laser beam emitted from the light-emitting device toward the corresponding disk-shaped recording medium is greater than the angle of incidence on the light splitter of the first laser beam emitted from the light-emitting device toward the corresponding disk-shaped recording medium.

Another optical pickup and disk drive apparatus according to the present invention has a light-emitting device having a first light emitter and a second light emitter for emitting, to two different types of disk-shaped recording media, respectively, a first laser beam and a second laser beam, respectively, having a first wavelength and a second wavelength, respectively, which correspond to the respective disk-shaped recording media, a light splitter for passing the first laser beam and the second laser beam which are emitted from the light-emitting device toward the disk-shaped recording media, and reflecting the first laser beam and the second laser beam which are reflected respectively by the disk-shaped recording media, a collimator lens disposed between the light splitter and the objective lens, for converting the first laser beam and the second laser beam which are emitted from the light-emitting device into a parallel beam, a light-detecting device for being irradiated with the first laser beam and the second laser beam which are reflected by the disk-shaped recording media, and a coupling lens disposed between the light-emitting device and the collimator lens, for changing an optical magnification from the light-emitting device to the disk-shaped recording media and an optical magnification from the disk-shaped recording media to the light-detecting device, the first laser beam having an optical axis aligned with the optical axis of the objective lens, the second laser beam having an optical axis displaced off the optical axis of the objective lens, wherein the distance from the light-emitting device to the coupling lens is of 0.26F or more where F represents the combined focal length of the collimator lens and the coupling lens.

The optical pickup and disk drive apparatus according to the present invention is thus effective to reduce the amount of aberrations generated when the second laser beam is emitted.

BEST MODE FOR CARRYING OUT THE INVENTION

An embodiment of an optical pickup and disk drive apparatus according to the present invention will be described below with reference to the accompanying drawings.

Figure 1:
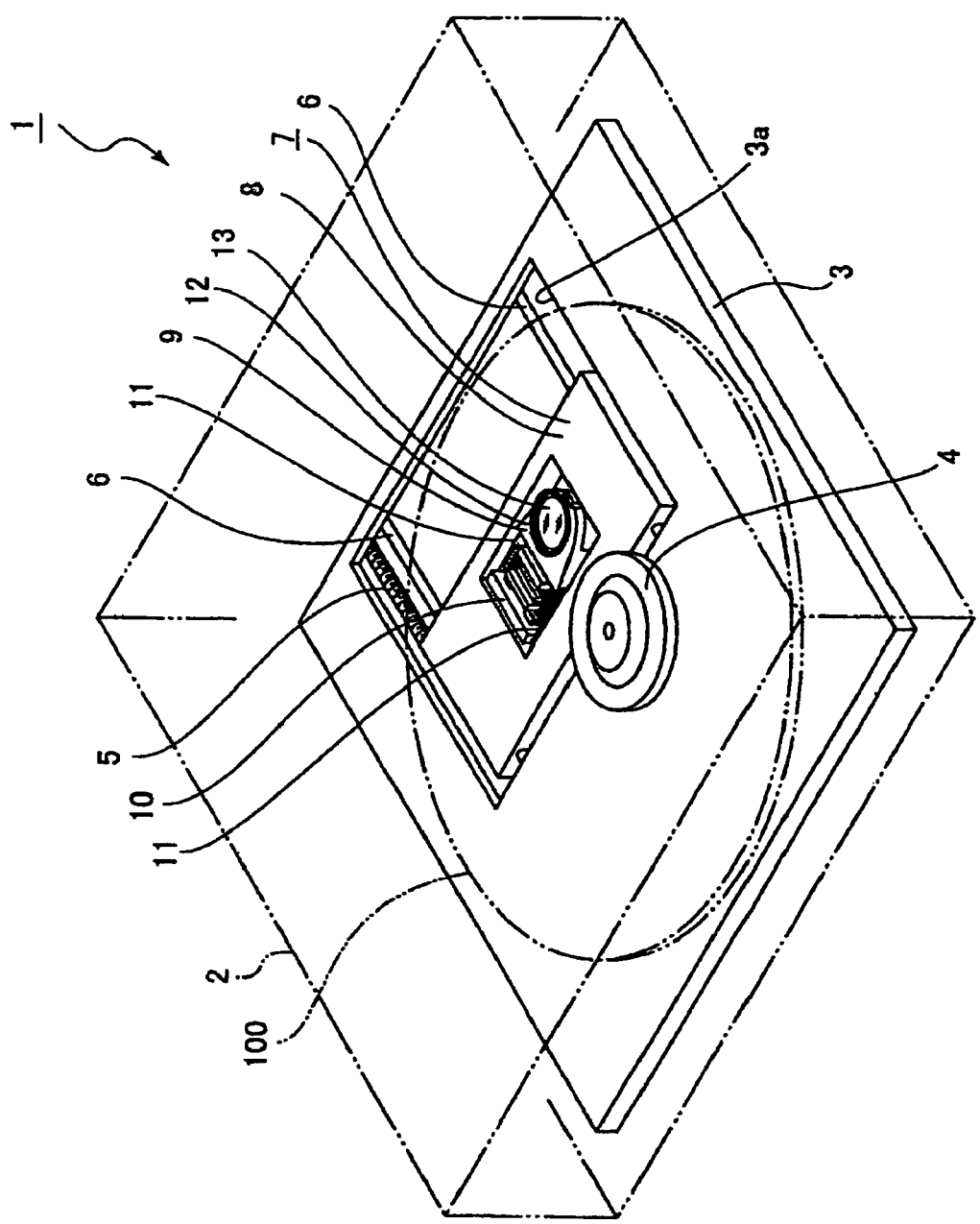
FIG. 1, together with FIGS. 2 through 8, shows an embodiment of the present invention, FIG. 1 being a schematic perspective view of a disk drive apparatus.

A disk drive apparatus 1 has members and mechanisms disposed in an outer casing 2 (see FIG. 1).

A chassis 3 is disposed in the outer casing 2, and a spindle motor, not shown, is mounted on the chassis 3. The spindle motor has a motor shaft to which there is fixed a disk table 4 projecting upwardly from the chassis 3.

A lead screw 5 and guide shafts 6, 6 are disposed parallel to each other below a lower surface of the chassis 3. The chassis 3 has a placement hole 3a defined therein, and an optical pickup 7 is disposed in placement hole 3a for movement radially across a disk-shaped recording medium 100 that is to be mounted on the disk table 4.

The optical pickup 7 has a movable base 8, an optical element (optical device) mounted on the movable base 8, and an objective lens actuator 9 supported on the movable base 8. The movable base 8 has opposite ends slidably supported respectively on the guide shafts 6, 6. A nut, not shown, mounted on the movable base 8 is threaded over the lead screw 5. When the lead screw 5 is rotated about its own axis by a feed motor, not shown, mounted on the movable base 8, the nut is fed in a direction depending on the rotating direction of the lead screw 5, moving the optical pickup 7 across the radius of the disk-shaped recording medium 100 mounted on the disk table 4 while the optical pickup 7 is being guided by the guide shafts 6, 6.

The objective lens actuator 9 has a fixed member 10 and a movable member 12 movably supported on the fixed member 10 by a plurality of suspensions 11, 11, . . . . The movable member 12 holds an objective lens 13 for focusing a first laser beam and a second laser beam, to be described later, onto the recording surface of the disk-shaped recording medium 100.

Figure 2:
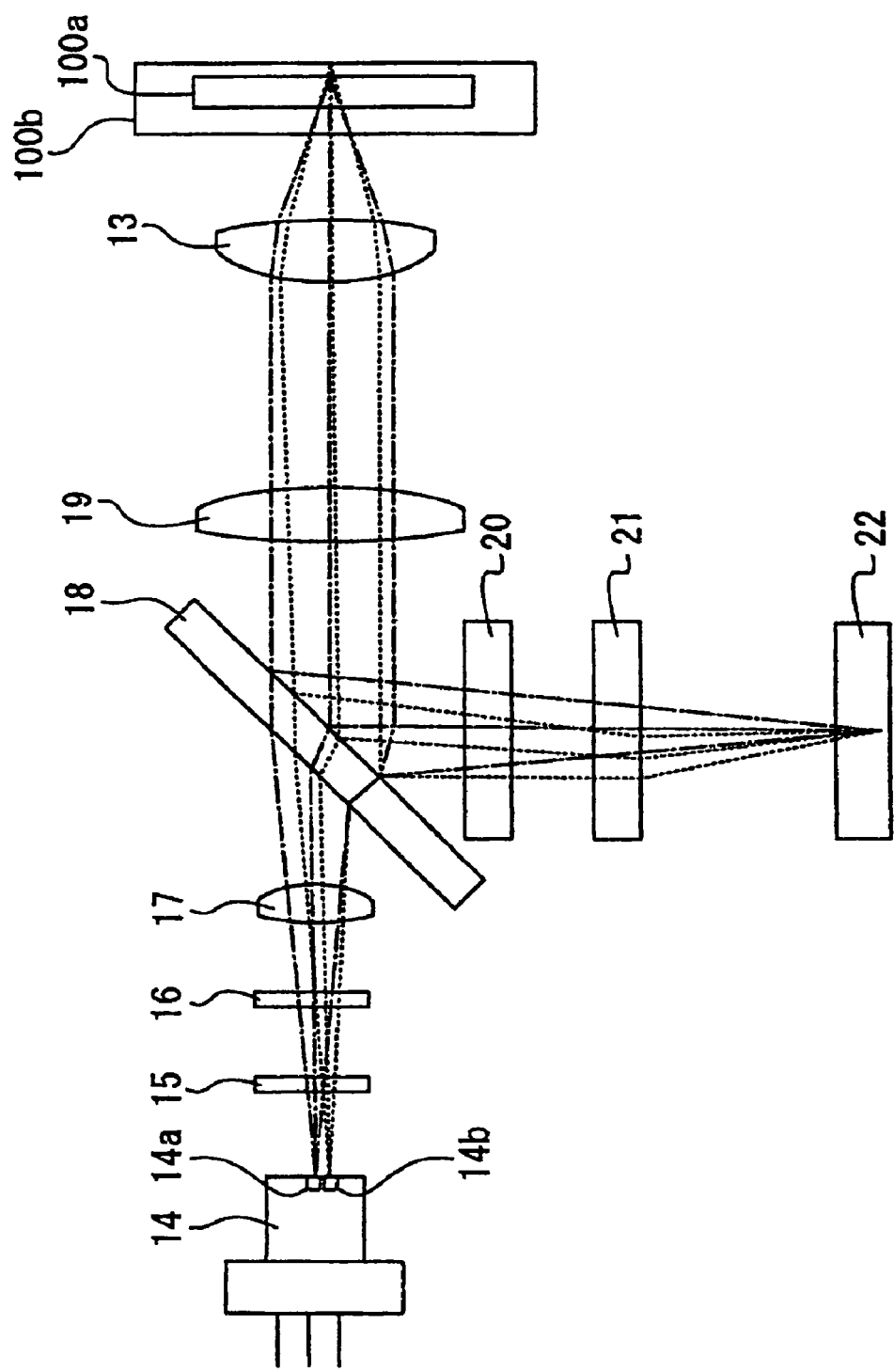
FIG. 2 is a conceptual diagram showing an arrangement of an optical system in an optical pickup.

Various optical elements are disposed on the movable base 8 (see FIG. 2).

The optical elements include a light-emitting device 14, a grating 15, a polarization converter 16, a coupling lens 17, a light splitter 18, a collimator lens 19, the objective lens 13 in the objective lens actuator 9, a cylindrical lens 20, an optical axis combiner 21, and a light-detecting device 22. These optical elements make up an optical system of the disk drive apparatus 1.

The light-emitting device 14 has a first light emitter 14a and a second light emitter 14b for emitting respective laser beams having different wavelengths. The first light emitter 14a emits a first laser beam having a wavelength of 650 nm, for example, whereas the second light emitter 14b emits a second laser beam having a wavelength of 780 nm, for example. For recording an information signal on or reproducing an information signal from one disk-shaped recording medium 100, i.e., a DVD 100a, the first light emitter 14a emits the first laser beam. For recording an information signal on or reproducing an information signal from another disk-shaped recording medium 100, i.e., a CD 100b, the second light emitter 14b emits the second laser beam.

The first light emitter 14a and the second light emitter 14b are spaced from each other by a distance ranging from 30 μm to 300 μm, for example, in a direction perpendicular to the optical axis of the objective lens 13. For example, the first laser beam has its optical axis aligned with the optical axis of the objective lens 13, and the second laser beam has its optical axis displaced off the optical axis of the objective lens 13.

Conversely, the first laser beam may have its optical axis displaced off the optical axis of the objective lens 13, and the second laser beam may have its optical axis aligned with the optical axis of the objective lens 13.

The grating 15 has a function to diffract the first laser beam and the second laser beam to form three spots on the recording surface of the disk-shaped recording medium 100 in order to detect a tracking error signal.

The polarization converter 16 comprises a ¼ wavelength plate, for example. The polarization converter 16 has a function to limit the return to the light-emitting device 14 of the first laser beam and the second laser beam that are reflected by the disk-shaped recording medium 100. The polarization converter 16 may be inclined to the optical axis to correct coma.

The coupling lens 17 is disposed in the optical path between the light-emitting device 14 and the collimator lens 19. The coupling lens 17 has a function to change the optical magnification from the light-emitting device 14 to the disk-shaped recording medium 100 and the optical magnification from the disk-shaped recording medium 100 to the light-detecting device 22.

The light splitter 18 comprises a beam splitter plate, for example. The light splitter 18 is of the so-called transmissive type. The light splitter 18 passes the first and second laser beams that are emitted from the light-emitting device 14 toward the disk-shaped recording medium 100, and reflects the first and second laser beams that are reflected by the disk-shaped recording medium 100.

The light splitter 18 is not limited to a beam splitter plate, but may be any of the transmissive type having a function to slip laser beams. For example, the light splitter 18 may comprise a beam splitter prism.

The collimator lens 19 is disposed in the optical path between the light splitter 18 and the objective lens 13, and has a function to convert the first and second laser beams into a parallel beam. The collimator lens 19 may have one toric surface for correcting astigmatism.

The cylindrical lens 20 is used to detect a focusing error signal according to the astigmatic method. If a focusing error signal is to be detected according to another method such as the Foucault method, rather than the astigmatic method, then a holographic element or a prism is used instead of the cylindrical lens 20.

The optical axis combiner 21 is an optical device with wavelength selectivity. The optical axis combiner 21 has a function to correct the direction of the optical axis of the second laser beam which is displaced off the optical axis of the objective lens 13 for applying the second laser beam to a predetermined light-detecting area of the light-detecting device 22.

In the optical system thus constructed, when the first laser beam is emitted from the first light emitter 14a of the light-emitting device 14, the emitted first laser beam is diffracted by the grating 15, and applied via the polarization converter 16 and the coupling lens 17 to the light splitter 18. The first laser beam that has been applied to the light splitter 18 passes through the light splitter 18, and is converted by the collimator lens 19 into a parallel beam, which is focused onto the recording surface of the DVD 100a mounted on the disk table 4 by the objective lens 13. The laser beam that has been focused onto the recording surface of the DVD 100a is reflected thereby and applied as a returning laser beam through the objective lens 13 and the collimator lens 19 to the light splitter 18. The returning laser beam that has been applied to the light splitter 18 is reflected thereby and applied through the cylindrical lens 20 and the optical axis combiner 21 to the light-detecting device 22.

When the returning laser beam is applied to the light-detecting device 22 in a reproduction mode, for example, an information signal recorded on the DVD 100a is read. At the same time, a focusing error signal and a tracking error signal are detected. Based on the detected focusing error signal and tracking error signal, the movable member 12 of the objective lens actuator 9 is displaced with respect to the fixed member 10 for thereby making focusing and tracking adjustments.

When the second laser beam is emitted from the second light emitter 14b of the light-emitting device 14, the emitted second laser beam is diffracted by the grating 15, and applied via the polarization converter 16 and the coupling lens 17 to the light splitter 18. The second laser beam that has been applied to the light splitter 18 passes through the light splitter 18, and is converted by the collimator lens 19 into a parallel beam, which is focused onto the recording surface of the CD 100b mounted on the disk table 4 by the objective lens 13. The laser beam that has been focused onto the recording surface of the CD 100b is reflected thereby and applied as a returning laser beam through the objective lens 13 and the collimator lens 19 to the light splitter 18. The returning laser beam that has been applied to the light splitter 18 is reflected thereby and passes through the cylindrical lens 20. After the direction of the optical axis of the returning laser beam is corrected by the optical axis combiner 21, the returning laser beam is applied to the light-detecting device 22.

When the returning laser beam is applied to the light-detecting device 22 in a reproduction mode, for example, an information signal recorded on the CD 100b is read. At the same time, a focusing error signal and a tracking error signal are detected. Based on the detected focusing error signal and tracking error signal, the movable member 12 of the objective lens actuator 9 is displaced with respect to the fixed member 10 for thereby making focusing and tracking adjustments.

In the above optical system, since the optical axis of one of the laser beams is displaced off the optical axis of the objective lens 13, the following two means are employed to control the generation of aberrations:

According to the first means, the second light emitter 14b is positioned such that the angle of incidence on the light splitter 18 of the second laser beam emitted from the light-emitting device 14 to the disk-shaped recording medium 100 is greater than the angle of incidence on the light splitter 18 of the first laser beam emitted from the light-emitting device 14 to the disk-shaped recording medium 100.

The first means will be described below.

Figure 3:
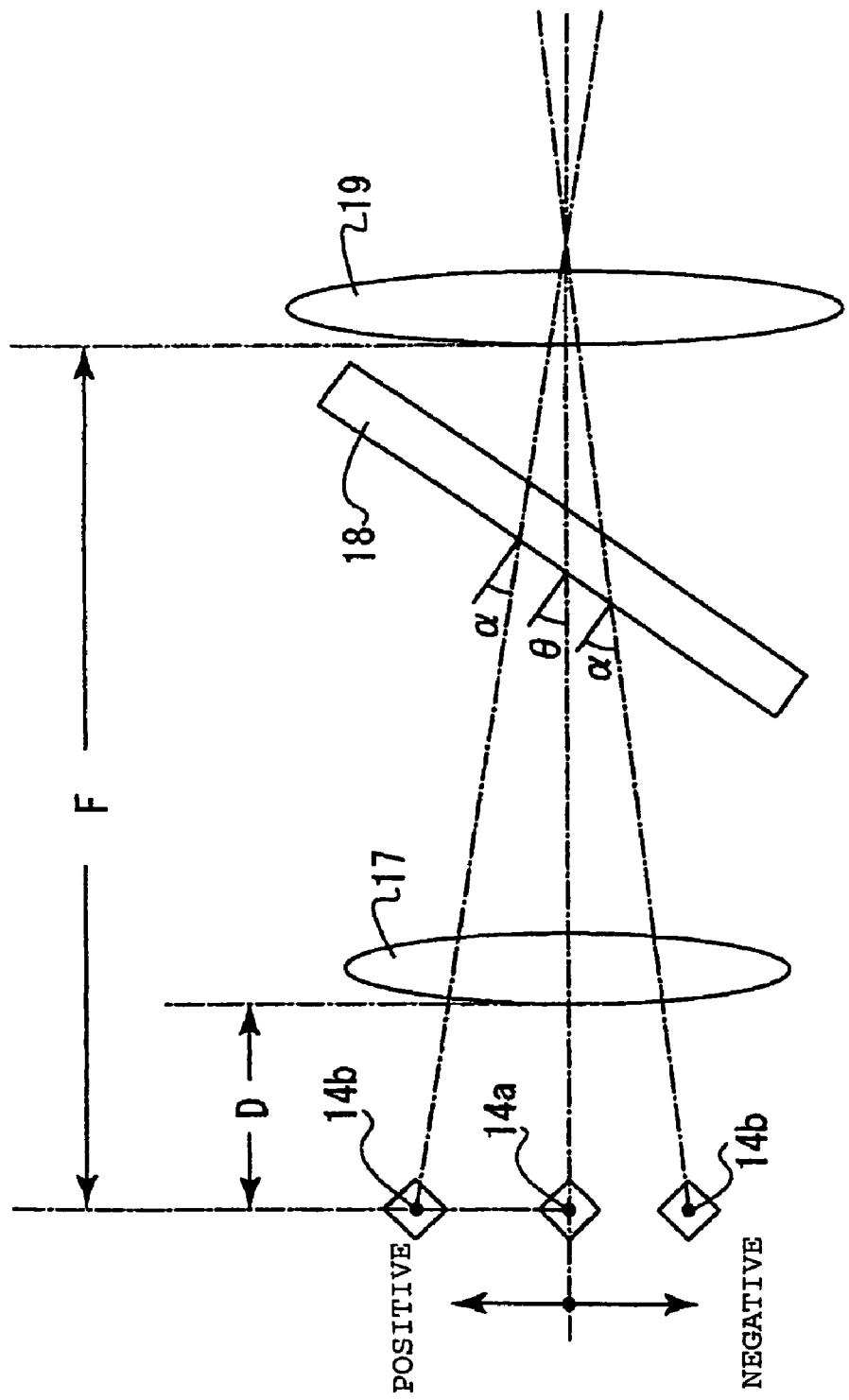
FIG. 3 is a conceptual diagram showing angles of incidence of laser beams applied to a light splitter and the relationship between a focal length F and a distance D.
Figure 4:
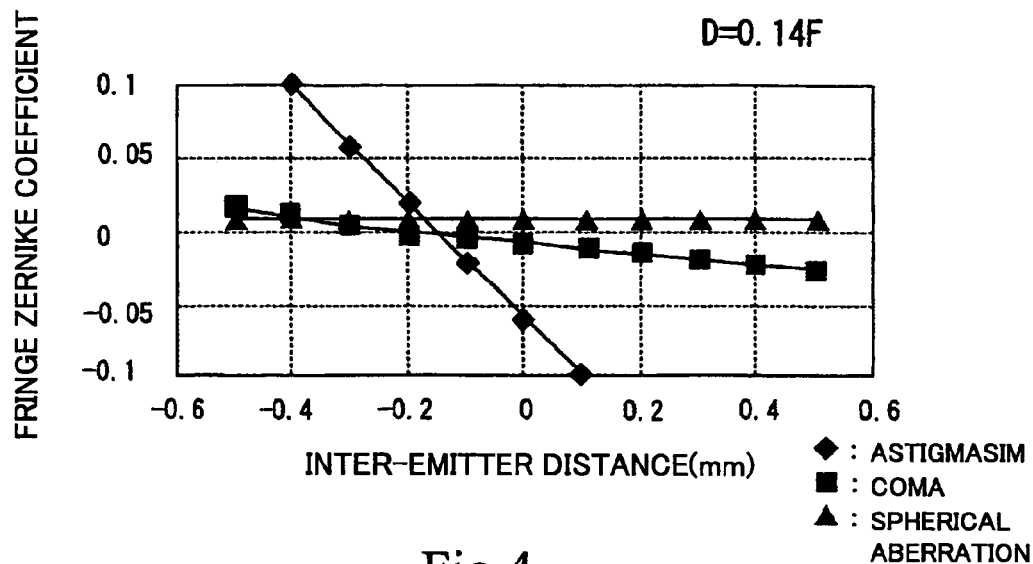
FIG. 4, together with FIGS. 5 through 8, shows amounts of aberrations generated with respect to the inter-emitter distance at the time the distance D is changed with respect to the focal length F, FIG. 4 being a graph plotted when D=0.14 F.
Figure 5:
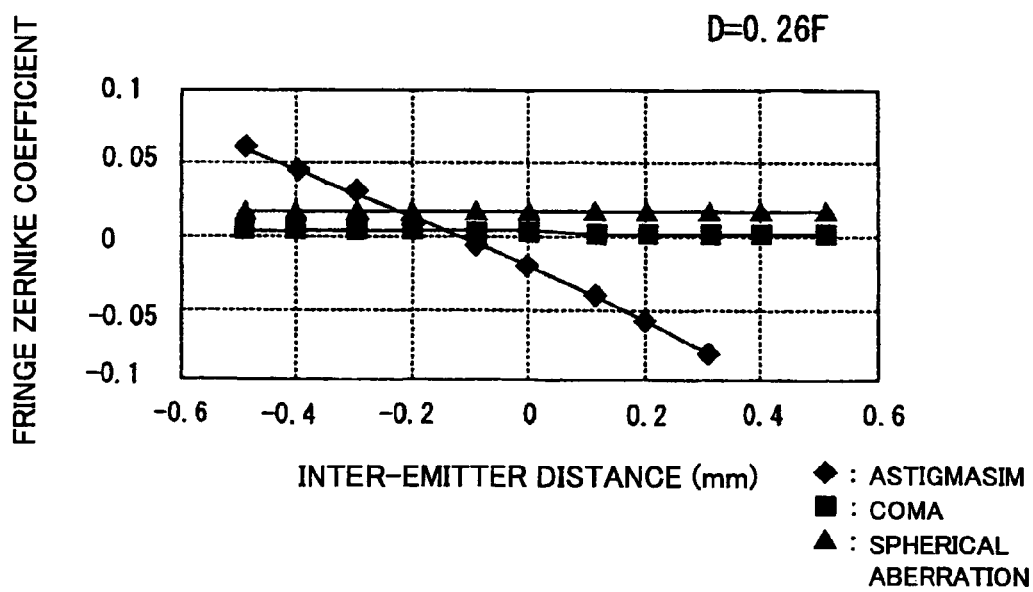
FIG. 5 is graph plotted when D=0.26F.
Figure 6:
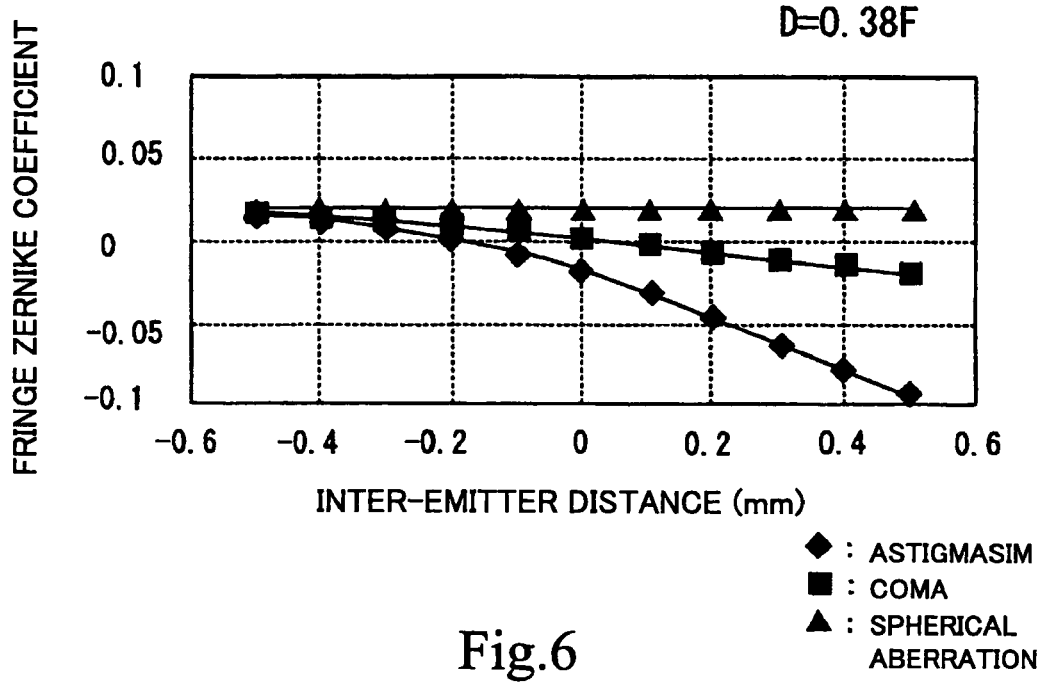
FIG. 6 is graph plotted when D=0.38F.
Figure 7:
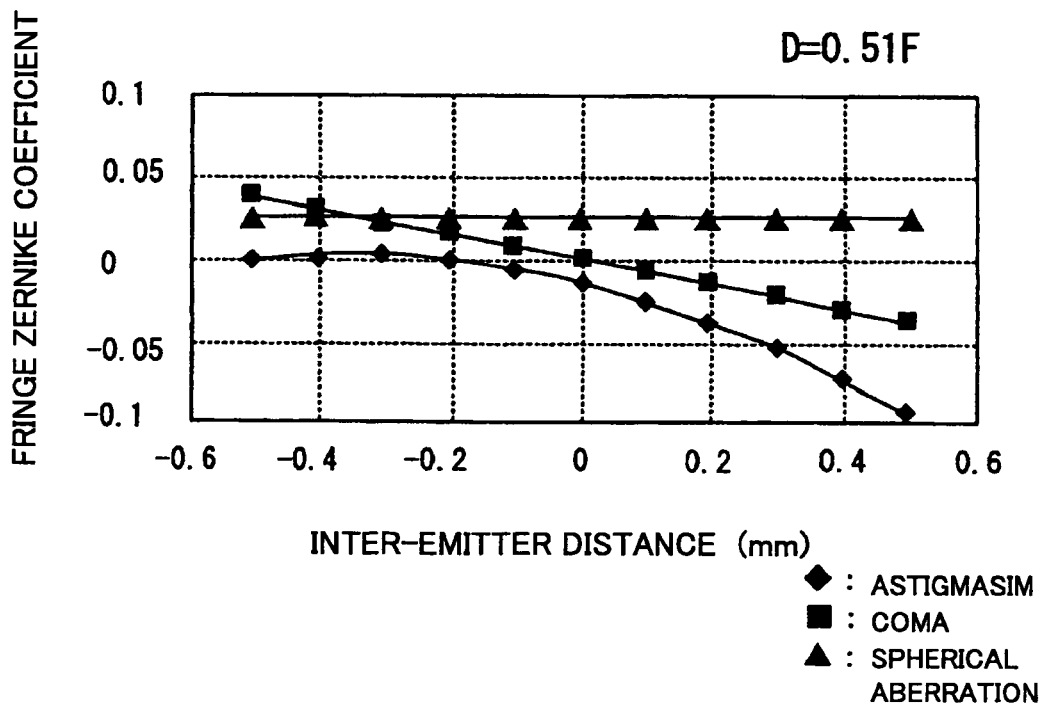
FIG. 7 is graph plotted when D=0.51F.
Figure 8:
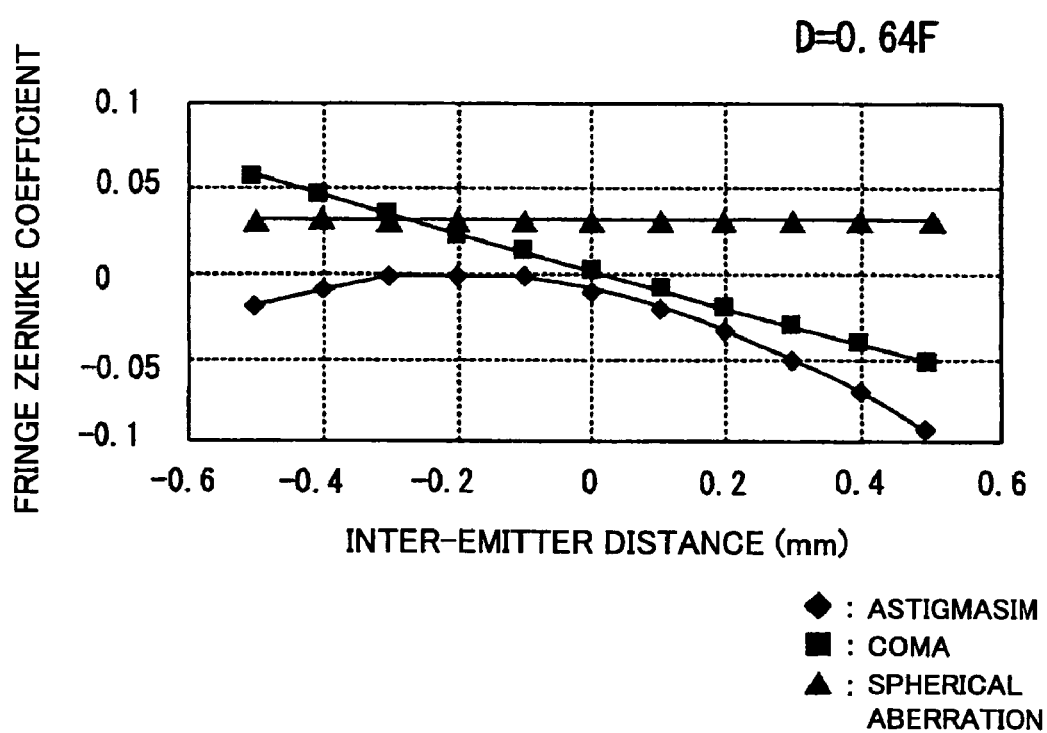
FIG. 8 is graph plotted when D=0.64F.

As shown in FIG. 3, if the angle of incidence of the first laser beam on the light splitter 18 is represented by $\theta$ and the angle of incidence of the second laser beam on the light splitter 18 is represented by $\alpha$, then since the light splitter 18 is inclined to the optical axis, the angle $\alpha$ of incidence becomes smaller than the angle $\theta$ of incidence as the second light emitter 14b is progressively spaced from the first light emitter 14a in one direction, and the angle $\alpha$ of incidence becomes greater than the angle $\theta$ of incidence as the second light emitter 14b is progressively spaced from the first light emitter 14a in the opposite direction. The region where the angle $\alpha$ of incidence is smaller than the angle $\theta$ of incidence is referred to as a positive region, and the region where the angle $\alpha$ of incidence is greater than the angle $\theta$ of incidence is referred to as a negative region.

FIGS. 4 through 8 are graphs showing amounts of aberrations generated with respect to the distance from the second light emitter 14b to the first light emitter 14a (hereinafter referred to as "inter-emitter distance") at the time the distance D (see FIG. 3) from the light-emitting device 14 (the first light emitter 14a, the second light emitter 14b) to the coupling lens 17 is changed with respect to the combined focal length F (see FIG. 3) of the collimator lens 19 and the coupling lens 17. The inter-emitter distance is negative in the region where the angle $\alpha$ of incidence is greater than the angle $\theta$ of incidence and positive in the region the angle $\alpha$ of incidence is smaller than the angle $\theta$ of incidence. In the graphs, the magnitudes of the aberrations are represented by a predetermined coefficient (Fringe Zernike coefficient).

As shown in the graphs of FIGS. 4 through 8, the amount of generated spherical aberration remains substantially unchanged even if the inter-emitter distance is changed. The amount of generated coma is 0 if the inter-emitter distance is 0 or negative. The amount of generated astigmatism is 0 if the inter-emitter distance is negative. Therefore, in order to suppress the generation of the aberrations, it is desirable to place the second light emitter 14b at a position where the inter-emitter distance is negative, i.e., the angle $\alpha$ of incidence is greater than the angle $\theta$ of incidence.

In the above optical system, therefore, the second light emitter 14b is placed at a position where the angle $\alpha$ of incidence is greater than the angle $\theta$ of incidence. For example, the second light emitter 14b is disposed in a position that is 0.2 mm spaced from the first light emitter 14a in the negative region.

According to the second means, the light-emitting device 14, the coupling lens 17, and the collimator lens 19 are disposed in a position where the distance D from the light-emitting device 14 to the coupling lens 17 is 0.26F or more with respect to the combined focal length F of the collimator lens 19 and the coupling lens 17.

The second means will be described below.

As shown in the graphs of FIGS. 4 through 8, the amount of generated spherical aberration does not greatly increase or decrease even if the distance D is changed with respect to the focal length F. The amount of generated coma is small at D=0.14F, D=0.26F, and D=0.38F, and falls in a relatively small range at D=0.51F and D=0.64F. The amount of generated astigmatism is particularly greatly changed depending on the inter-emitter distance at D=0.14F. Therefore, it is desirable to have the distance D of 0.26F or greater in order to suppress the generation of the aberrations.

In the above optical system, the light-emitting device 14, the coupling lens 17, and the collimator lens 19 are disposed such that the distance D is of 0.26F or greater.

As described above, in order to suppress the generation of the aberrations, it is desirable to place the second light emitter 14b at a position where the angle α of incidence is greater than the angle θ of incidence, and to place the light-emitting device 14, the coupling lens 17, and the collimator lens 19 such that the distance D is of 0.26F or greater. In particular, it is most desirable to minimize the total amount of generated spherical aberration, coma, and astigmatism. For example, if the distance D is of about 0.38F and the inter-emitter distance is of about 0.2 in the negative region, then the total amount of the generated aberrations is small, and hence the generation of the aberrations can effectively be suppressed.

As described above, in the optical pickup 7, the second light emitter 14b is placed at a position where the angle α of incidence of the second laser beam on the light splitter 18 is greater than the angle θ of incidence of the first laser beam on the light splitter 18.

Therefore, the generation of the aberrations is suppressed. The optical pickup 7 can have better performance, prevent recording errors and reproduction errors, and provide improved playability.

Furthermore, in the optical pickup 7, the distance D from the light-emitting device 14 to the coupling lens 17 is of 0.26D or more with respect to the combined focal length F of the collimator lens 19 and the coupling lens 17.

Consequently, the generation of the aberrations is further suppressed. The optical pickup 7 can have better performance, reliably prevent recording errors and reproduction errors, and provide further improved playability.

In the above embodiment, the first laser beam emitted from the first light emitter 14a has its optical axis aligned with the optical axis of the objective lens 13, and the second laser beam emitted from the second light emitter 14b has its optical axis displaced off the optical axis of the objective lens 13. Conversely, if the second laser beam has its optical axis aligned with the optical axis of the objective lens 13, and the first laser beam has its optical axis displaced off the optical axis of the objective lens 13, then the distance D represents a distance up to the first light emitter 14a using the second light emitter 14b as a reference.

The specific shapes and structures of the various parts illustrated in the above embodiment are given by way of example only in reducing the present invention to practice, and should not be relied upon in any way to lead to a restrictive interpretation of the technical scope of the present invention.

INDUSTRIAL APPLICABILITY

As is apparent from the foregoing description, according to the invention as described in claim 1, claim 2, claim 3, and claim 4, the generation of the aberrations is suppressed, and the optical pickup can have better performance, prevent recording errors and reproduction errors, and provide improved playability.

What is claimed is:

1. An optical pickup movable radially across a disk-shaped recording medium mounted on a disk table, for applying a laser beam to the disk-shaped recording medium through an objective lens, comprising:

a light-emitting device having a first light emitter and a second light emitter for emitting, to two different types of disk-shaped recording media, respectively, a first laser beam and a second laser beam, respectively, having a first wavelength and a second wavelength, respectively, which correspond to the respective disk-shaped recording media;

a light splitter for passing the first laser beam and the second laser beam which are emitted from the light-emitting device toward the disk-shaped recording media, and reflecting the first laser beam and the second laser beam which are reflected respectively by the disk-shaped recording media;

a collimator lens disposed between the light splitter and the objective lens, for converting the first laser beam and the second laser beam which are emitted from the light-emitting device into a parallel beam;

a light-detecting device for being irradiated with the first laser beam and the second laser beam which are reflected by the light splitter; and a coupling lens disposed between the light-emitting device and the collimator lens, for changing an optical magnification from the light-emitting device to the disk-shaped recording media and an optical magnification from the disk-shaped recording media to the light-detecting device;

the first laser beam having an optical axis aligned with the optical axis of the objective lens, the second laser beam having an optical axis displaced off the optical axis of the objective lens;

wherein the distance from the light-emitting device to the coupling lens is of 0.26F or more where F represents the combined focal length of the collimator lens and the coupling lens.

2. A disk drive apparatus having a rotatable disk table for mounting a disk-shaped recording medium thereon, and an optical pickup having an objective lens actuator supported on a movable base and movable radially across the disk-shaped recording medium mounted on the disk table, for applying a laser beam to the disk-shaped recording medium through an objective lens, wherein said optical pickup comprising:

a light-emitting device having a first light emitter and a second light emitter for emitting, to two different types of disk-shaped recording media, respectively, a first laser beam and a second laser beam, respectively, having a first wavelength and a second wavelength, respectively, which correspond to the respective disk-shaped recording media;

a light splitter for passing the first laser beam and the second laser beam which are emitted from the light-emitting device toward the disk-shaped recording media, and reflecting the first laser beam and the second laser beam which are reflected respectively by the disk-shaped recording media;

a collimator lens disposed between the light splitter and the objective lens, for converting the first laser beam and the second laser beam which are emitted from the light-emitting device into a parallel beam;

a light-detecting device for being irradiated with the first laser beam and the second laser beam which are reflected by the light splitter; and a coupling lens disposed between the light-emitting device and the collimator lens, for changing an optical magnification from the light-emitting device to the disk-shaped recording media and an optical magnification from the disk-shaped recording media to the light-detecting device;

the first laser beam having an optical axis aligned with the optical axis of the objective lens, the second laser beam having an optical axis displaced off the optical axis of the objective lens;

wherein the distance from the light-emitting device to the coupling lens is of 0.26F or more where F represents the combined focal length of the collimator lens and the coupling lens.

* * * * *